United States Patent
Cha et al.

(10) Patent No.: US 12,335,212 B2
(45) Date of Patent: *Jun. 17, 2025

(54) METHOD AND SERVER FOR PROVIDING CONTENT LIST AND OPERATING METHOD OF USER TERMINAL

(71) Applicant: KAKAO CORP., Jeju-si (KR)

(72) Inventors: Su Hyeok Cha, Seongnam-si (KR); Tae Heon Lee, Seongnam-si (KR); Hee Young Lee, Seongnam-si (KR); Bo Kyung Kim, Seongnam-si (KR); Gi Hyouk Lee, Seongnam-si (KR); Won Jae Lee, Seongnam-si (KR); Yang Kyun Park, Seongnam-si (KR); Hui Hyeon Kim, Seongnam-si (KR); Ji Sun Park, Seongnam-si (KR); Won Bom Hong, Seongnam-si (KR); Hye Won Jeong, Seongnam-si (KR); Ji Yeong Kim, Seongnam-si (KR); Jee Min Yang, Seongnam-si (KR); Hee Jin Lim, Seongnam-si (KR); Ji Hyun Son, Seongnam-si (KR); Min Jeong Yang, Seongnam-si (KR); Ah Seong Kim, Seongnam-si (KR); So Yeon Kim, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/677,927

(22) Filed: May 30, 2024

(65) Prior Publication Data
US 2024/0314092 A1    Sep. 19, 2024

Related U.S. Application Data

(63) Continuation of application No. 17/551,809, filed on Dec. 15, 2021, now Pat. No. 12,034,681.

(30) Foreign Application Priority Data

Dec. 15, 2020 (KR) .......................... 10-2020-0175882

(51) Int. Cl.
*H04L 51/046* (2022.01)
*G06F 40/30* (2020.01)
(Continued)

(52) U.S. Cl.
CPC ............ *H04L 51/046* (2013.01); *G06F 40/30* (2020.01); *H04L 51/10* (2013.01); *H04L 51/216* (2022.05)

(58) Field of Classification Search
None
See application file for complete search history.

(56) References Cited

U.S. PATENT DOCUMENTS

| 2011/0185025 A1* | 7/2011 | Cherukuri | ........... H04L 12/1813 709/206 |
| 2012/0233662 A1* | 9/2012 | Scott-Cowley | ......... H04L 51/04 709/204 |

(Continued)

FOREIGN PATENT DOCUMENTS

| KR | 1020160112260 A | 9/2016 |
| KR | 20180033873 A | 4/2018 |

(Continued)

*Primary Examiner* — Christopher B Robinson
*Assistant Examiner* — Tania M Pena-Santana
(74) *Attorney, Agent, or Firm* — NKL LAW; Jae Youn Kim

(57) ABSTRACT

Provided are a method and server for providing a content list. The method and server for providing a content list includes: providing source content to a chat room, receiving a request for providing a content list related to the source content from a first terminal of a first member; providing at least one of a first content list including at least one keyword-related content selected from among the entire (Continued)

contents stored in the server based on a keyword of the source content and a second content list including at least one group-related content belonging to the same group as a group of the source content among the entire contents, receiving information on selection content selected by the first member among the contents included in the at least one content list, from the first terminal, and providing the selection content to the chat room.

15 Claims, 12 Drawing Sheets

(51) Int. Cl.
*H04L 51/10* (2022.01)
*H04L 51/216* (2022.01)

(56) References Cited

U.S. PATENT DOCUMENTS

| | | |
|---|---|---|
| 2013/0159919 A1 | 6/2013 | Leydon |
| 2019/0007352 A1 | 1/2019 | Doh |
| 2019/0108239 A1* | 4/2019 | Yang .................... G06Q 10/107 |
| 2022/0239986 A1* | 7/2022 | Kang .................. H04L 12/1822 |

FOREIGN PATENT DOCUMENTS

| | | |
|---|---|---|
| KR | 101986153 B1 | 6/2019 |
| KR | 20200094963 A | 8/2020 |

* cited by examiner

Case 4

METHOD AND SERVER FOR PROVIDING CONTENT LIST AND OPERATING METHOD OF USER TERMINAL

CROSS REFERENCE TO RELATED APPLICATIONS

This application is a continuation of copending U.S. patent application Ser. No. 17/551,809, filed Dec. 15, 2021, which is incorporated herein by reference in its entirety, and claims the benefit of Korean Patent Application No. 10-2020-0175882 filed on Dec. 15, 2020, the disclosure of which is incorporated herein by reference in its entirety.

BACKGROUND

Field (Technical Field)

The present disclosure relates to a method and server for providing a content list and an operating method for a user terminal.

Description of Related Art

In general, an emoticon, a pictogram, is a compound word of two words, emotion and icon and is a unique expression language on the Internet created to express various emotions, specific animation characters, jobs, etc. by appropriately combining letters, symbols, and numbers on a computer keyboard.

In recent years, with the development of technology, messages (multimedia message service (MMS)) including high-resolution images may be easily used in mobile devices, and as the types of message applications run in mobile devices are diverse, an animation-type emoticon that outputs an image of a specific character or shows a dynamic appearance of a corresponding character for a certain period of time may be used beyond the existing emoticons using special characters.

However, emoticons in the form of images or animations are in a simple list form and a user has to scroll and select a page, causing user inconvenience. In addition, even when the user enters a store to purchase, the emoticons are listed by characters, making it difficult for the user to find an emoticon expressing a desired look or feeling.

SUMMARY

An aspect of the present disclosure may provide a method and server for providing a content list to easily use emoticons used by a chatting counterpart in a chat room, and an operating method for a user terminal.

In an aspect, a method for providing a content list by a server includes: a source content providing operation in which at least one processor included in the server provides source content to a chat room; a request receiving operation in which the at least one processor receives a request for providing a content list related to the source content from a first terminal of a first member; a content list providing operation in which the at least one processor provides at least one of (1) a first content list including at least one keyword-related content selected based on a keyword of the source content among the entire contents and (2) a second content list including at least one group-related content belonging to the same group as a group of the source content among the entire contents; a selection result receiving operation in which the at least one processor receives information on selection content selected by the first member among the contents included in the at least one content list; and a selection content providing operation in which the at least one processor provides the selection content to the chat room.

The method may further include: a selecting operation in which the at least one processor selects, as the keyword-related content, a content having the keyword satisfying a predetermined condition from the keyword of the source content among the entire contents.

The keyword satisfying the predetermined condition may be a keyword which is the same as or similar to the keyword of the source content or a keyword corresponding to a predetermined combination with the keyword of the source content.

At least some of the entire contents may be configured as a single group with another content according to a predetermined condition.

The predetermined condition may be one or more of a content regarding the same animation character, a content regarding an animation character belonging to the same family, and a content created by the same creator.

The source content and the keyword-related content may be contents that belong to different groups.

The method may further include: an authority determining operation in which the at least one processor determines whether the first member has a first authority to receive the first content list, wherein, in the content list providing operation, whether to provide the first content list may be determined according to whether the first member has the first authority.

The method may further include: an authority determining operation in which the at least one processor determines whether the first member has a second authority to receive the second content list, wherein, in the content list providing operation, whether to provide the second content list may be determined according to whether second first member has the second authority.

The second authority may be determined according to whether the first member has a first authority to receive the first content list or has an authority for a group to which the source content belongs.

The method may further include: a provision availability determining operation in which the at least one processor determines whether the first content list is available to be provided according to whether there is a keyword of the source content or whether a number of the keyword-related content is equal to or greater than a predetermined reference, wherein whether the first content list is available to be provided may be determined during the content list providing operation according to whether the first content list is available to be provided.

The method may further include: a provision availability determining operation in which the at least one processor determines whether the second content list is available to be provided according to whether there is a group to which the source content belongs or whether the number of group-related contents is equal to or greater than the predetermined reference, wherein whether the second content list is available to be provided may be determined during the content list providing operation according to whether the second content list is available to be provided.

In another aspect, a server for providing a content list includes: a memory; and at least one processor connected to the memory and configured to execute instructions included in the memory, wherein the at least one processor is configured to perform control to provide a source content to a chat room, perform control to receive a request for providing a content list related to the source content from a first terminal of a first member, perform control to provide at least one of a first content list including at least one keyword-related content selected based on a keyword of the source content among the entire contents and a second content list including at least one group-related content belonging to the same group as a group of the source content among the entire contents, perform control to receive information on a selection content selected by the first member among contents included in the at least one content list from the first terminal, and perform control to provide the selection content to the chat room.

The at least one processor may further perform control to select, as the keyword-related content, a content having the keyword satisfying a predetermined condition from the keyword of the source content among the entire contents.

The keyword satisfying the predetermined condition may be a keyword which is the same as or similar to the keyword of the source content or a keyword corresponding to a predetermined combination with the keyword of the source content.

At least some of the entire contents may be configured as a single group with another content according to a predetermined condition.

The predetermined condition may be one or more of a content regarding the same animation character, a content regarding an animation character belonging to the same family, and a content created by the same creator.

The at least one processor may determine whether the first member has a first authority to receive the first content list, and determine whether to provide the first content list according to whether the first member has the first authority.

The at least one processor may determine whether the first member has a second authority to receive the second content list, and determine whether to provide the second content list according to whether the first member has the second authority.

In another aspect, an operating method for a user terminal may include: displaying, by the user terminal, a source content provided by a counterpart participant of a chat room on the chat room; receiving, by the user terminal, selection on the source content from a user; displaying, by the user terminal, at least one of (1) a first content list including at least one keyword-related content related to a keyword of the source content and (2) a second content list including at least one group-related content that belong to the same group as a group of the source content on the user terminal; receiving, by the user terminal, selection for any one content among the contents included in the at least one content list from the user; and displaying, by the user terminal, the any one content on the chat room.

In the displaying on the user terminal, the user terminal displays at least one of the first content list and the second content list in a partial area of the chat room of the user terminal In the present disclosure, a first content list related to a keyword for a source content used by a second member who is a chatting counterpart in a chat room and a second content list related to a group to which the source content belongs may be provided to a first terminal of a first member who is a user so that the user may use the content easily, thereby improving user convenience.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, embodiments of the present disclosure will be described in detail with reference to the accompanying drawings. In describing the present disclosure, if it is determined that a detailed description of known functions and components associated with the present disclosure unnecessarily obscure the gist of the present disclosure, the detailed description thereof is omitted. The terms used henceforth are used to appropriately express the embodiments of the present disclosure and may be altered according to a person of a related field or conventional practice. Therefore, the terms should be defined on the basis of the entire content of this disclosure.

Technical terms used in the present specification are used only in order to describe specific embodiments rather than limiting the present disclosure. The terms of a singular form may include plural forms unless referred to the contrary. It will be further understood that the terms "comprise" and/or "comprising," when used herein, specify the presence of stated features, integers, steps, operations, elements, and/or components, but do not preclude the presence or addition of one or more other features, regions, integers, steps, operations, elements, components, and/or groups thereof.

Hereinafter, the present disclosure is described with reference to the accompanying drawings.

Figure 1:
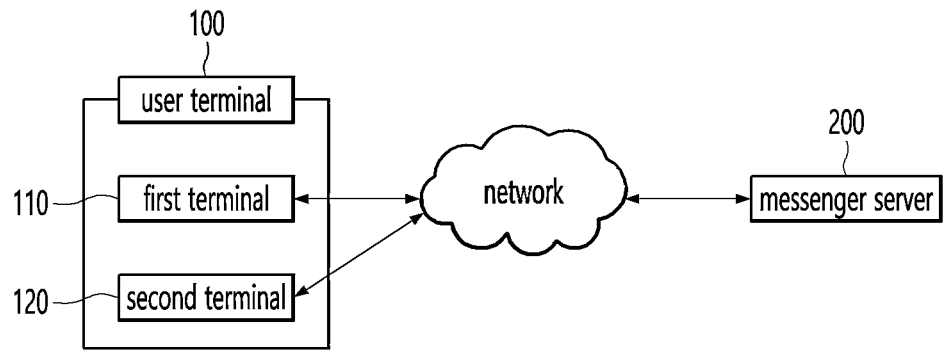
FIG. 1 is a block diagram illustrating a concept of a content list providing method according to an example of the present disclosure.

FIG. 1 is a view illustrating a concept of a system for providing a content list according to an example of the present disclosure.

As shown in FIG. 1, the system for providing a content list according to an example of the present disclosure may include a user terminal 100 and a messenger server 200.

The user terminal 100 may be a terminal of a user that is connected to the messenger server 200 and provided with a content list through a chat room provided in an instant message service provided by the messenger server 200. For example, the user terminal 100 may be a wireless communication device such as a desktop, a notebook computer, a mobile communication terminal, a personal digital assistant (PDA), a smartphone, a tablet, a smart TV, and the like.

For example, the user terminal 100 may include a first terminal 110 used by a first member and a second terminal 120 used by a second member.

Here, the first and second members may be users of accounts subscribed to an instant message service of the messenger server 200 through the user terminal 100.

The messenger server 200 is a computer device connected to the user terminal 100 through a network, and may be a server having an internal memory and a processor therein to provide an instant message service to the first and second members.

As described above, the messenger server 200 of the present disclosure may provide an instant message service to the first member and the second member. Here, the first member may be a user himself/herself on the instant message service, and the second member may be a counterpart who participates in chatting in the same chat room as the first member on the instant message service.

In the instant message service provided by the messenger server in the content list providing system, when the second member uses a specific content (e.g., source emoticon) through the chat room while the first member and the second member use the instant message service, at least one processor included in the messenger server may provide, as a recommended content list (hereinafter, a "first content list"), a list of contents having the same key word as a key word included in content used by the second member and/or a list (hereinafter, a "second content list") of contents of a group to which the content used by the second member belongs to the first member.

In FIG. 1, a case in which the messenger server providing an instant message service provides a content list is described as an example, but the present disclosure is not limited thereto.

For example, the server providing the content list may be provided separately from the messenger server providing the instant message service, and may provide the aforementioned content list through the instant message service by interworking with the messenger server.

Hereinafter, an example of a method in which the aforementioned messenger server provides a content list to the first member in relation to source content that is an emoticon used by the second member who is a chatting counterpart on the instant message service is described.

Figure 2:
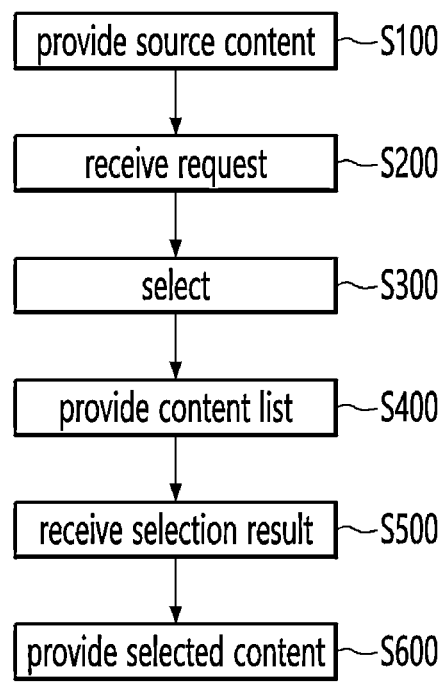
FIG. 2 is a view illustrating a first embodiment of a method for providing a content list by a messenger server illustrated in FIG. 1 to a first terminal of a first member.

FIG. 2 is a view illustrating a first embodiment of a method in which the messenger server shown in FIG. 1 provides a content list to a first terminal of a first member, and FIGS. 3 to 7 are views specifically illustrating the method for providing a content list according to a first embodiment.

As shown in FIG. 2, the method for providing a content list by the messenger server to the first terminal of the first member according to an example of the present disclosure includes a source content providing operation (S100), a request receiving operation (S200), a selection operation (S300), a content list providing operation (S400), a selection result receiving operation (S500), and a selected content providing operation (S600) may be included.

Here, a case in which the selection operation (S300) is performed between the request receiving operation (S200) and the content list providing operation (S400) is illustrated as an example, but the present disclosure is not limited thereto, and the selection operation (S300) may be performed in any stage between the source content providing operation (S100) and the content list providing operation S600). Hereinafter, the example shown in FIG. 2 is described as an example for convenience of description.

Hereinafter, a method for providing a content list according to the first embodiment is described with reference to FIGS. 3 to 7 together with FIG. 2.

Figure 3:
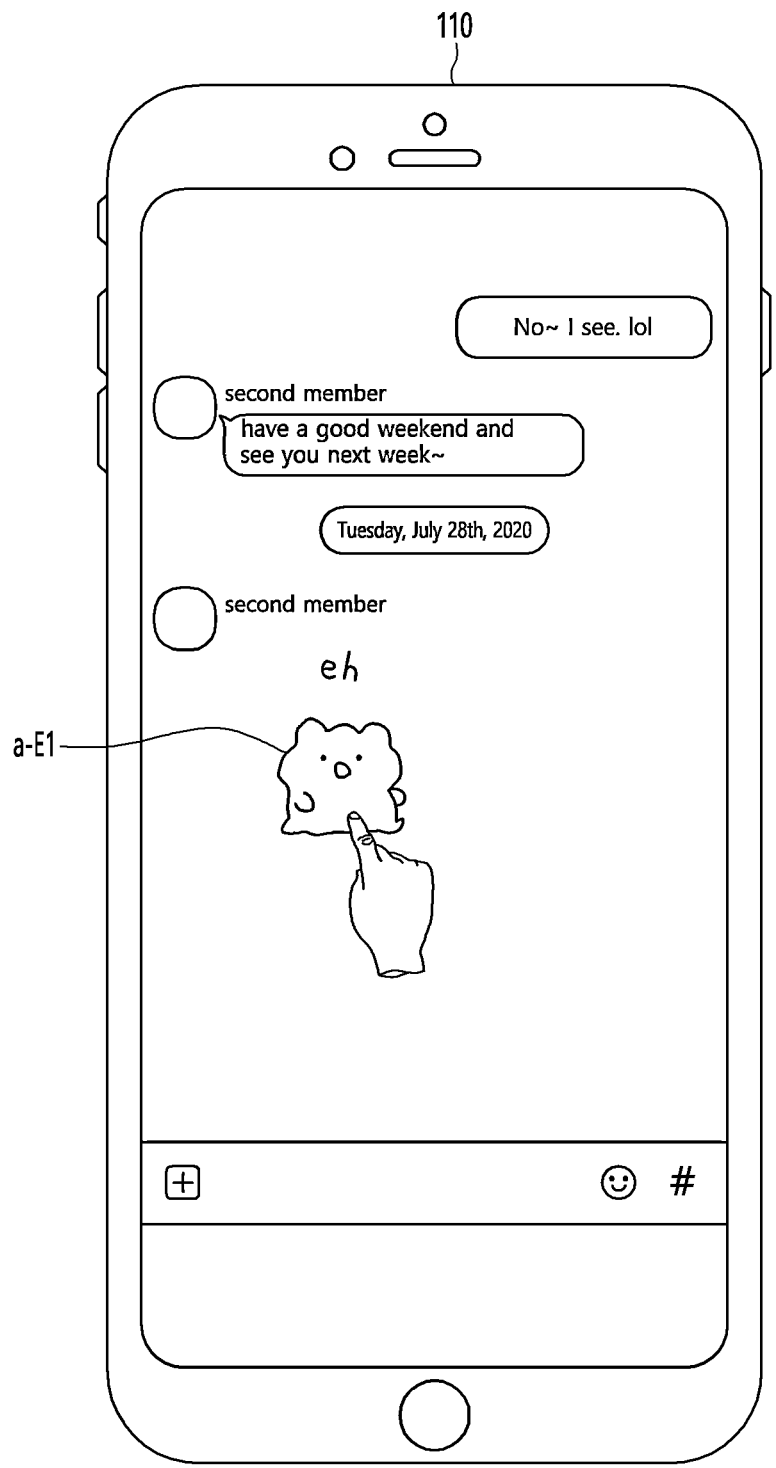
FIGS. 3 to 7 are views specifically illustrating a method for providing a content list according to a first embodiment.

In the source content providing operation (S100), as shown in FIG. 3, in a state in which the first member and the second member participate in the chat room provided by the instant message service, when the second member selectively uses a source content a-E1 in chatting, the messenger server 200 may receive content identification information for the source content a-E1 from the second terminal 120 of the second member and provide the source content a-E1 to the chat room.

Here, the source content refers to content used by the counterpart (e.g., the second member) participating in the chat room.

For reference, keyword information on each content (e.g., an emoticon) is stored in the messenger server 200, and each content may be classified by groups according to an animation character or design.

Each content may include content identification information, and keyword information of each content and group information to which each content belongs may be stored in the messenger server 200.

Here, the keyword information of the content may refer to information on a word that is dependent on the content and is associated with an animation character or design of the content.

In addition, there may be one or a plurality of keyword information for one content. For example, content having an animation character of a smiling dog may include only keyword information of laugh or may also include information on a plurality of keywords such as laugh, joy, delight, and ridicule.

The group information to which the content belongs may refer to information on a group having the same or similar type of animation character or design. For example, group information having a dog character designed in a specific shape and group information having a cat character designed in a specific shape may be different from each other.

In addition, even if the content has a puppy character or design, content having a bulldog puppy character and content having the Jindo dog puppy character may belong to different content groups.

Figure 4:
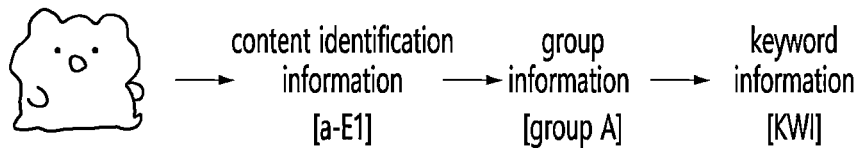

Accordingly, when the second member receives content identification information on source content a-E1 from the second terminal 120 of the second member using the source content a-E1 in the Instant message service, the messenger server 200 may identify group information (e.g., group A) to which the source content a-E1 belongs and keyword information (e.g., KW1) from the content identification information on the source content a-E1 as shown in FIG. 4, while providing the source content a-E1 to the chat room of the instant message service.

Thereafter, in the request receiving operation (S200), when the first member selects the source content a-E1 used by the second member in the chat room displayed on the first terminal 110 as shown in FIG. 3, the at least one messenger server 200 provided in the messenger server 200 may receive a request for providing a content list related to the source content a-E1 from the first terminal 110 of the first member.

Here, the method for the first member to select the source content a-E1 may be performed by the first member clicking (e.g., one-click or long-click) the source content a-E1 of the second member, and as the first member clicks the source content a-E1, the first terminal 110 may transmit information requesting providing of the content list related to the source content a-E1 from the messenger server 200 to the messenger server 200 as shown in FIG. 3.

Thereafter, in the selection operation (S300), at least one processor provided in the messenger server 200 may select content having a keyword satisfying a predetermined condition form the keyword of the source content a-E1, among the entire contents, as a keyword-related content.

Specifically, in the selection operation (S300), a first content list CG1 and a second content list CG2 may be selected from among the entire contents.

Here, the entire contents may refer to the entire contents stored in the messenger server 200.

However, the present disclosure is not necessarily limited thereto, and if there is a separate server that provides content by interworking with the messenger server, in addition to the messenger server 200, the entire contents may refer to all of the contents stored in the separate server. Alternatively, the entire contents may refer to the entire contents stored in the first terminal. The first content list CG1 may include keyword-related content having a keyword (e.g., the same or similar keyword) related to the keyword of the source content a-E1.

The second content list CG2 may include group-related content belonging to the same group as the group to which the source content a-E1 belongs.

In order to perform the selection operation S300 as described above, the at least one processor included in the messenger server 200 may extract group information (group A) of the source content and keyword information KW1 from the content identification information of the source content a-E1 stored in the messenger server 200 as shown in FIG. 4.

In addition, in the selection operation S300, in order to select the first content list DG1 related to the keyword of the source content a-E1, the at least one processor provided in the messenger server 200 may map keyword information extracted from each of the entire contents belonging to each group to the keyword information of the source content according to a predetermined condition to generate mapping pools MG1, MG2, and MG3.

Here, the keyword satisfying the predetermined condition may be a keyword which is the same as or similar to the keyword of the source content or may be a keyword corresponding to a predetermined combination with the keyword of the source content.

Figure 5:
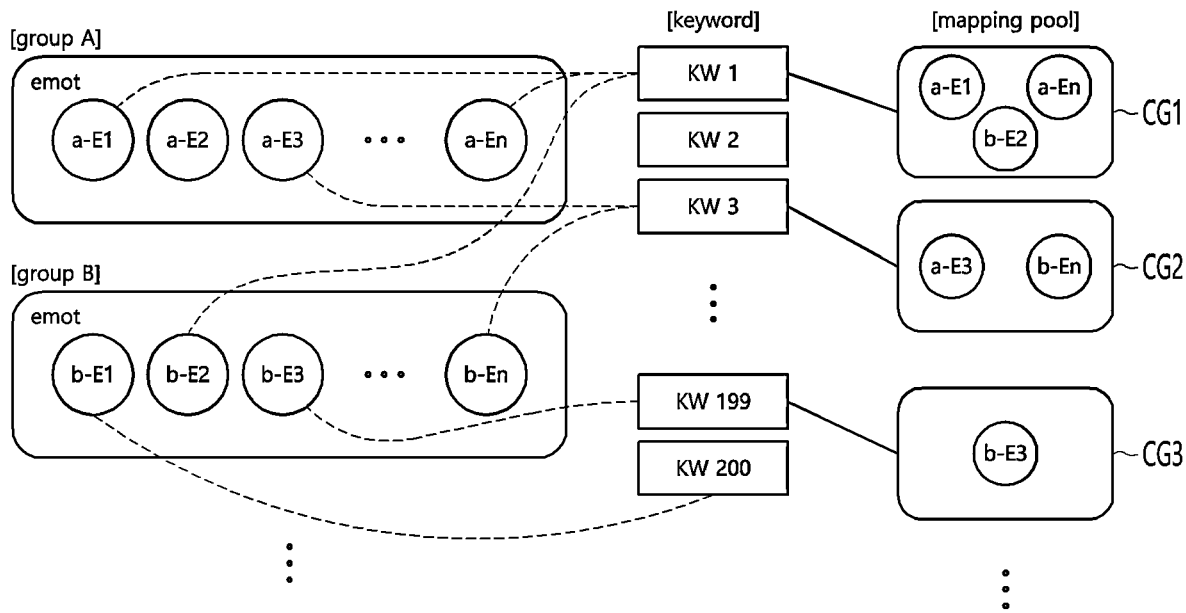

For example, as shown in FIG. 5, when the keyword information of the source content a-E1 is KW1 as shown in FIG. 4, among the plurality of mapping pools MG1, MG2, and MG3 classified according to keywords extracted from each of the entire contents belonging to each group as shown in FIG. 5, the at least one processor provided in the messenger server 200 may select the mapping group MG1 to which the related keyword contents a-E1, a-En, and b-E2 having the same keyword information of KW1 as the keyword information of the source content a-E1, among the mapping pools illustrated in FIG. 5, as the first content list CG1.

Here, at least one mapping group among the plurality of mapping pools may include different contents belonging to the same group or may include contents belonging to different groups but having keywords satisfying the same predetermined condition.

For example, as shown in FIG. 5, the first mapping group MG1, among the plurality of mapping pools MG1, MG2, and MG3, may include content a-En that belongs to the same group A as the source content a-E1 and has the same or similar keyword, as a keyword-related content, or the first mapping group MG1 may include content b-E2 that belongs to a group B different from that of the source content a-E1 but has the same or similar keyword, as a keyword-related content.

As described above, in the selection operation (S300) of the present disclosure, the first mapping group MG1 including the keyword-related contents a-E1, a-En, and b-E2, which are contents having the keyword satisfying a predetermined condition from the keyword of the source content a-E1, as the first content list CG1, regardless of content group.

However, the present disclosure is not necessarily limited thereto, and when the keyword information of the source content a-E1 is KW1, the at least one processor included in the messenger server 200 may select, as the first content list CG1, content having keyword information corresponding to a predetermined combination such as having keyword information having a concept that corresponds to, is contrasted to, or is opposite to KW1, the keyword information of the source content a-E1.

For example, when the keyword information of the source content is "tired", the at least one processor provided in the messenger server 200 may select content having the same keyword information as "tired" as a keyword-related content or may select content having keyword information of "go for it" according to a predetermined combination for "tired", as a keyword-related content.

In addition, in the selection operation (S300), the at least one processor provided in the messenger server 200 may select at least one group-related content belonging to the same group as the source content a-E1, among the entire contents, as the second content list CG2.

Here, the entire contents refer to all the contents previously stored in the server, and each content may have group information to which the corresponding content belongs.

Accordingly, at least a portion of the entire contents may form one group with different content according to a predetermined condition. Here, the predetermined condition may be any one or more of content relating to the same animation character, content relating to an animation character belonging to the same family, and content created by the same creator.

That is, each of the entire contents may form one content group with the same animation characters, form one content group with animation characters belonging to the same family, or form one content group with contents created by the same creator.

For example, as shown in FIG. 5, each of the entire contents may belong to a plurality of groups such as group A and group B, group A may include, for example, content of a specific dog character expressing various emotions, and group B may include, for example, content of a specific cat character expressing various emotions.

Alternatively, in FIG. 5, each of the contents belonging to the group A and the group B may have a form of an animation character belonging to the same family, or content created by the same creator. Hereinafter, for convenience of description, a case in which each of the plurality of groups are formed as each content group with the same animation characters is described as an example.

In the selection operation (S300), a content group belonging to the same group as the source content, among the plurality of content groups, may be selected as the second content list CG2.

Figure 6:
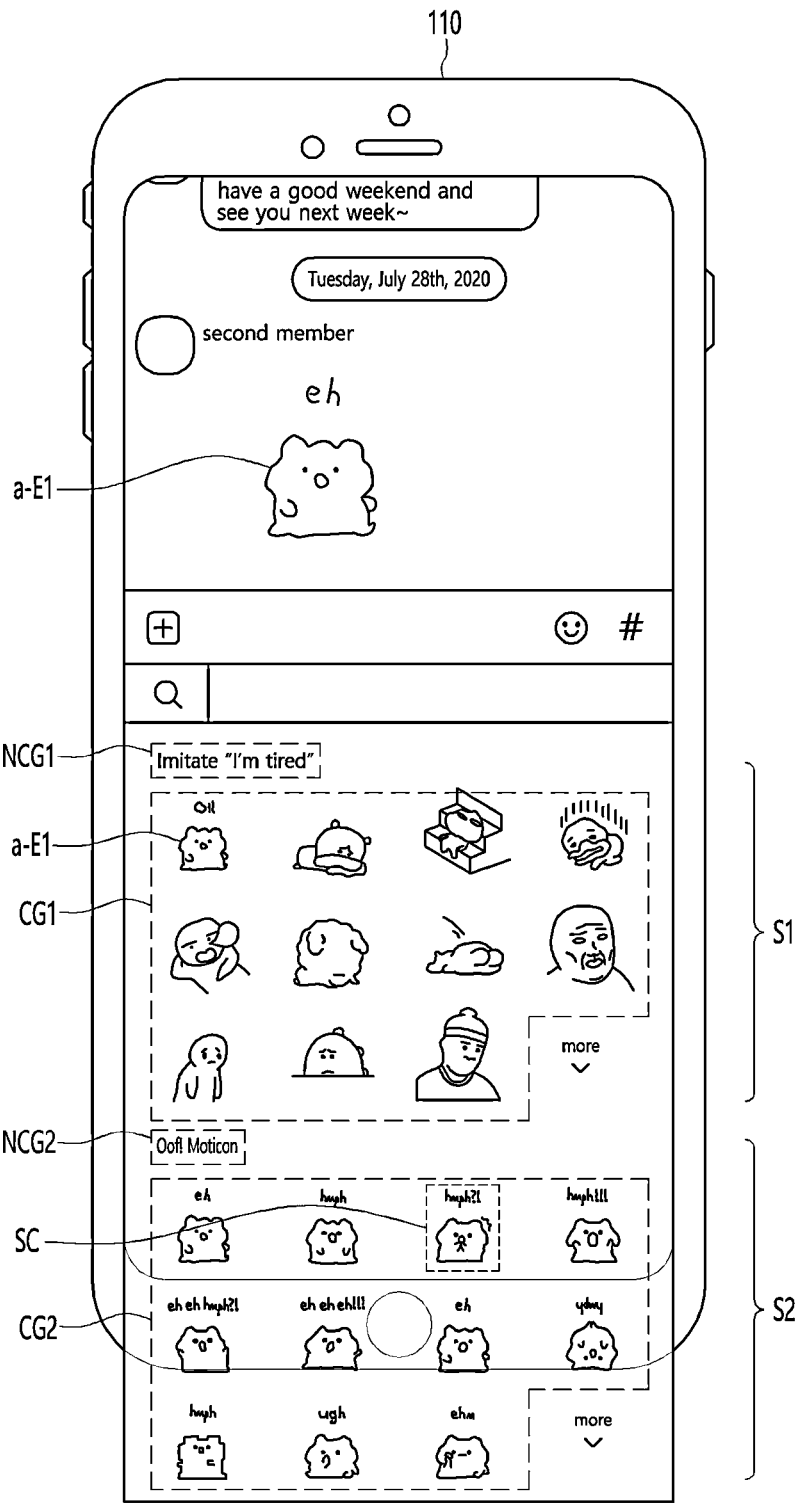

For example, when the source content a-E1 of FIG. 4 belongs to group A, since it belongs to group A among the plurality of content groups shown in FIG. 5, a case in which a plurality of group-related contents a-E1, a-E2, a-E3 to a-En) belonging to group A is selected as the second content list CG2 of FIG. 6 is illustrated as an example.

In the content list providing operation (S400), the at least one processor included in the messenger server 200 may provide the first terminal 110 with at least one content list among the first content list CG1 and the second content list CG2.

For example, the messenger server 200 may provide the first content list CG1 and the second content list CG2 to the first terminal 110 as shown in FIG. 6. FIG. 6 illustrates a case in which both the first content list CG1 and the second content list CG2 are provided as an example, but the present disclosure is not limited thereto, and in some cases, only the first content list CG1 or only the second content list CG2 may be provided. This is described below with reference to FIG. 8.

As shown in FIG. 6, the messenger server 200 may display a partial region of the chat room and display the first content list CG1 and the second content list CG2 at the bottom of a chatting input field. Here, the first and second content lists CG1 and CG2 may be displayed in a first region S1 and a second region S2 divided in a vertical direction of the chat room, respectively, and the first member may check the first content list CG1 and the second content list CG2, while dragging a display window of the first terminal 110 in the vertical direction.

When the first and second content lists CG1 and CG2 are displayed in the first and second regions S1 and S2, respectively, in the content list providing operation (S400), the chatting input field may rise up to a predetermined spot of the chat room to be displayed, and the first region S1 and the second region S2 may be displayed at the bottom of the chatting input field in the vertical direction.

In the first region S1, keyword information NCG1 of the source content a-E1 may be displayed, and the first content list CG1 including at least one content selected as keyword-related content may be displayed at the bottom of the keyword information of the source content a-E1 at the bottom.

In the first content list CG1, for example, the source content a-E1 input by the second member may be displayed at the top, and then contents may be displayed according to a ranking of the contents frequently used in the instant message service. However, the present disclosure is not limited thereto, and the contents may be arranged in various manners other than the ranking.

In addition, in the second region S2, name information NCG2 of the group to which the source content a-E1 belongs or content identification information for the source keyword may be displayed, and at the bottom, the second content list CG2 including at least one group-related content included in the group to which the source content a-E1 belongs may be displayed.

Figure 7:
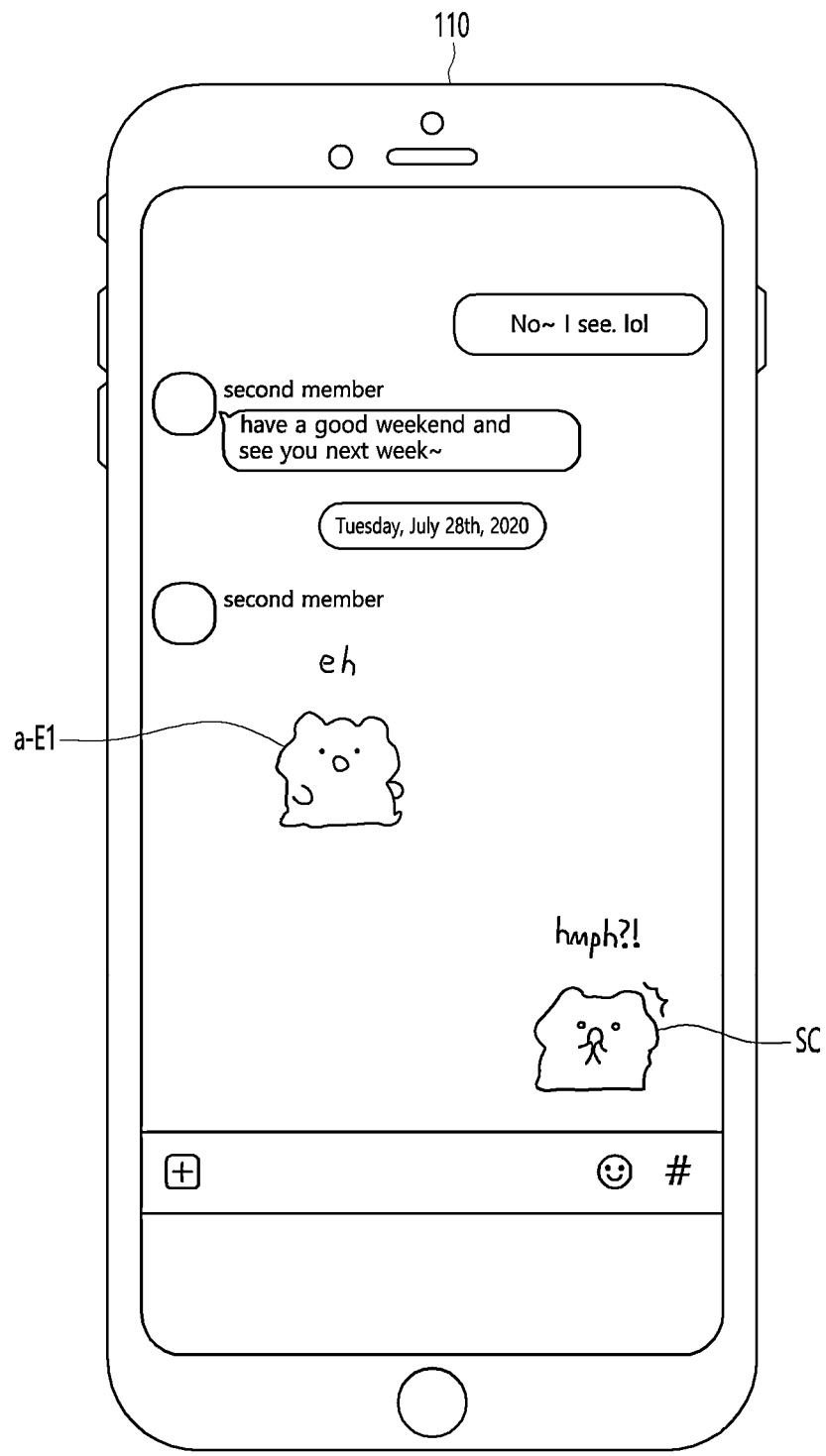

If the first member selects any one of the content SC in the first content list CG1 and the second content list CG2 displayed on the first terminal 110, the at least one processor included in the messenger server 200 may receive information on the selection content SC selected by the first member among contents included in the at least one content list from the first terminal in the selection result receiving operation (S500), and the messenger server 200 may provide the selection content to the chat room as shown in FIG. 7 in the selection content providing operation (S600).

As such, in the method for providing a content list according to an example of the present disclosure, the first content list CG1 having a related keyword for the source content a-E1 that the second member, a chatting counterpart, uses and the second content list CG2 related to the group to which the source content a-E1 belongs are provided to the first terminal 110 of the first member, so that the user may easily use the content, thereby increasing user convenience.

So far, a case in which both the first content list CG1 and the second content list CG2 are provided to the first terminal 110 of the first member in the content list providing method according to an example of the present disclosure has been described as an example, but the present disclosure is not limited thereto, and only any one of the first content list CG1 or the second content list CG2 may be provided or none may not be provided.

Hereinafter, a form in which the first content list CG1 and the second content list CG2 are differently provided according to the first member's authority to use is described below.

Figure 8:
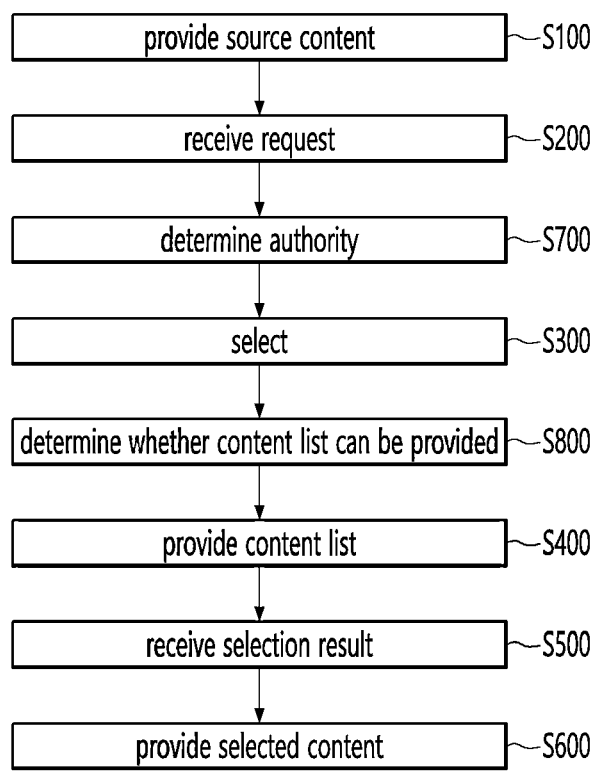
FIG. 8 is a view illustrating a second embodiment of a method for providing a content list by the messenger server illustrated in FIG. 1 to the first terminal of the first member.

FIG. 8 is a view illustrating a second embodiment of a method in which the messenger server 200 shown in FIG. 1 provides a content list to the first terminal 110 of the first member, and FIGS. 9 to 13 are views specifically illustrating a method for providing a content list according to the second embodiment.

A second embodiment of the method for the messenger server 200 to provide a content list to the first terminal 110 of the first member may include a source content providing operation (S100), a request receiving operation (S200), an authority determining operation (S700), a selection operation (S300), a provision availability determining operation (S800), a content list providing operation (S400), a selection result receiving operation (S500), and a selected content providing operation (600) as shown in FIG. 8.

In FIG. 8, a case in which the authority determining operation (S700) is performed between the request receiving operation (S200) and the selection operation (S300) is illustrated as an example, but the present disclosure is not necessarily limited thereto, and the authority determining operation (S700) may also be performed between the selection operation (S300) and the content list providing operation (S600).

In addition, although FIG. 8 illustrates a case in which the provision availability determining operation S800 is provided as an example, the provision availability determining operation S800 may be omitted in some cases. However, hereinafter, for convenience of description, the case in which the provision availability determining operation S800 is provided as shown in FIG. 8 is described as an example.

In the second embodiment shown in FIG. 8, the same parts as those of the first embodiment described above with reference to FIGS. 1 to 7 are replaced with the above descriptions, and other parts will be mainly described.

After the request receiving operation (S200), in the authority determining operation (S700), the at least one processor of the messenger server 200 may determine whether the first member has a first authority to receive the first content list CG1 and whether the first member has a second authority to receive the second content list CG2.

As such, according to whether the first member has the first authority for the first content list CG1 or the second authority for the second content list CG2, at least one of the first content list CG1 or the second content list CG2 may be selected in the selection operation, and whether to provide the first content list CG1 may be determined according to whether the first member has the first authority and whether to provide the second content list CG2 may be determined according to whether the first member has the second authority in the content list providing operation S400.

Here, for example, whether the first member has the first authority may be determined according to whether the first member is a regular payment user provided with the content list in the instant message service provided by the messenger server 200 or whether the first content lists CG1 may be provided for the source content a-E1. When the first member is a payment user for the first content list CG1 in operation of determining whether there is an authority the first content list CG1, it may be determined that the first member has authority for the first content list CG1.

The second authority may be determined according to whether the first member has a first authority to receive the first content list CG1 or whether the first member has an authority for the group to which the source content a-E1 belongs.

Figure 9:
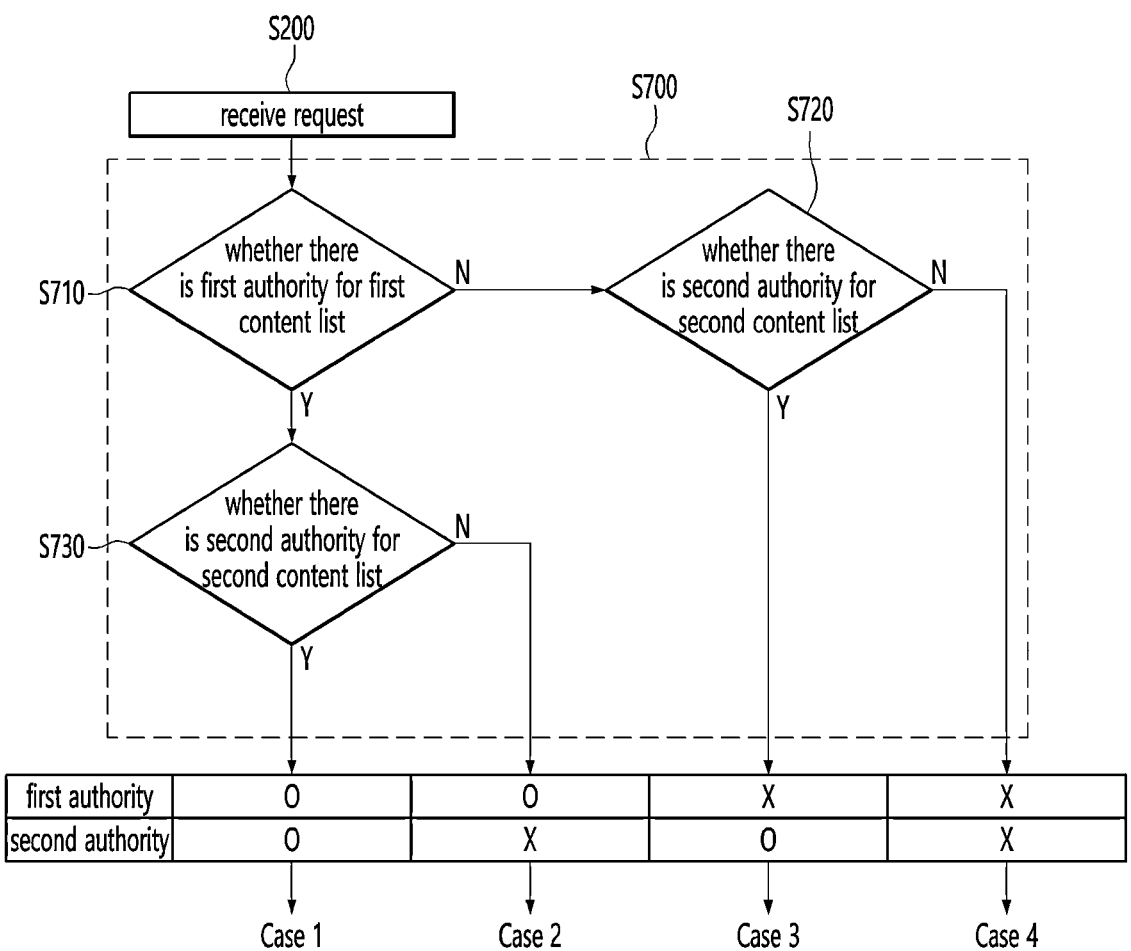
FIGS. 9 to 13 are views specifically illustrating a method for providing a content list according to a second embodiment.

Specifically, as an example, as shown in FIG. 9, in the authority determining operation (S700), it is determined whether the first member has the first authority for the first content list CG1 (S710), and whether the first member has the second authority for the second content CG2 may be determined (S720, and S730) for each of a case with the authority for the first content list CG1 or a case without the authority for the first content list CG1.

In the operation (S710) of determining whether there is an authority the first content list CG1, if the first member is a payment user that may be provided with the first content list CG1, keyword information for the source content a-E1 provided by the second member exists, and keyword-related content for the corresponding keyword information is provided in the server, the messenger server 200 may then determine that the first member has the first authority.

Figure 10:
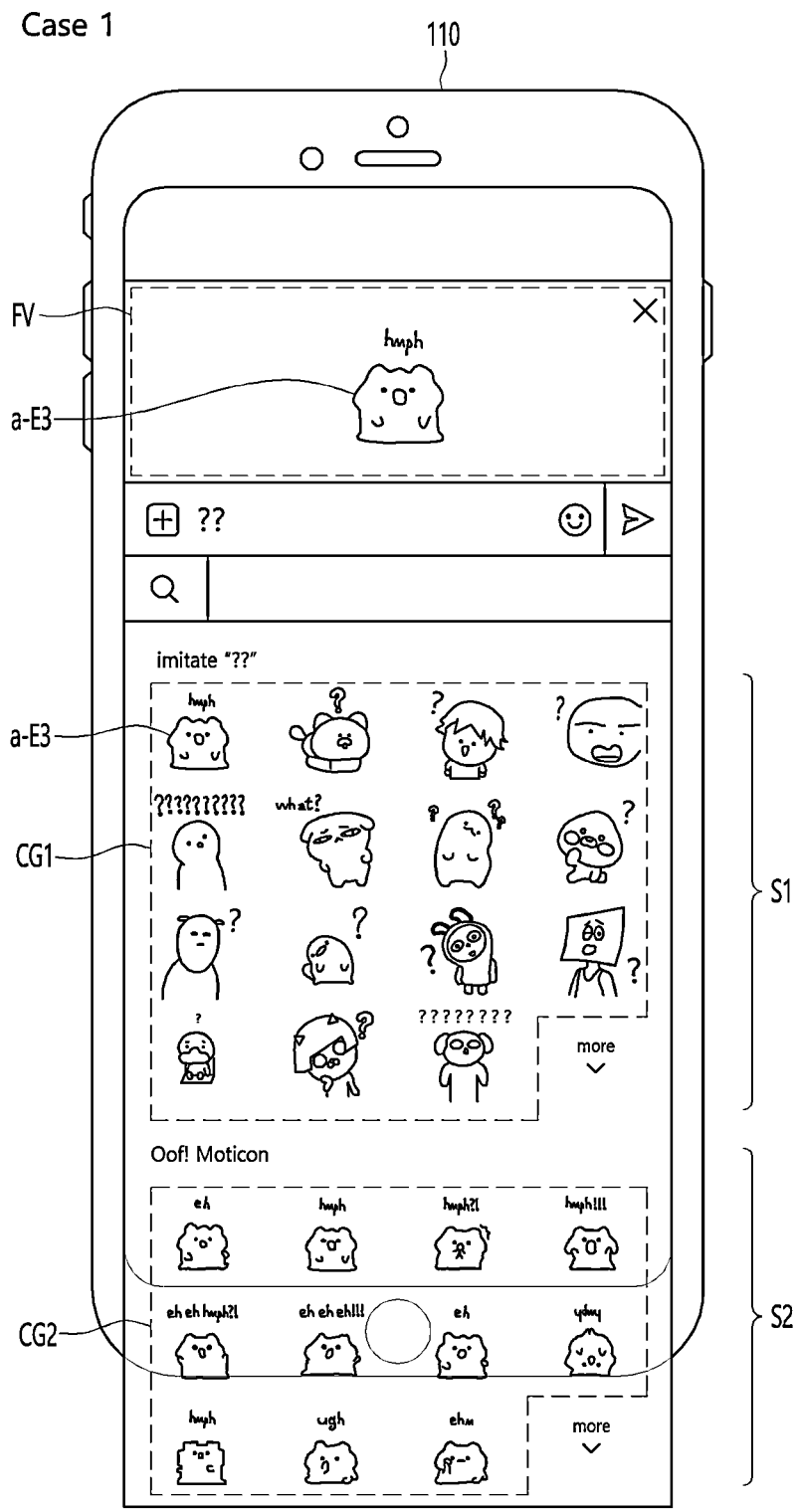

In addition, if the first member has the first authority, when the first member has an authority for the group to which the source content a-E1 belongs in the second authority determining operation (S730) for the second content list CG2, the first content list CG1 and the second content list CG2 may be selected in the selection operation S300), and the first content list CG1 and the second content list CG2 may be provided together to the first terminal 110 as in Case 1 illustrated in FIGS. 9 and 10.

Figure 11:
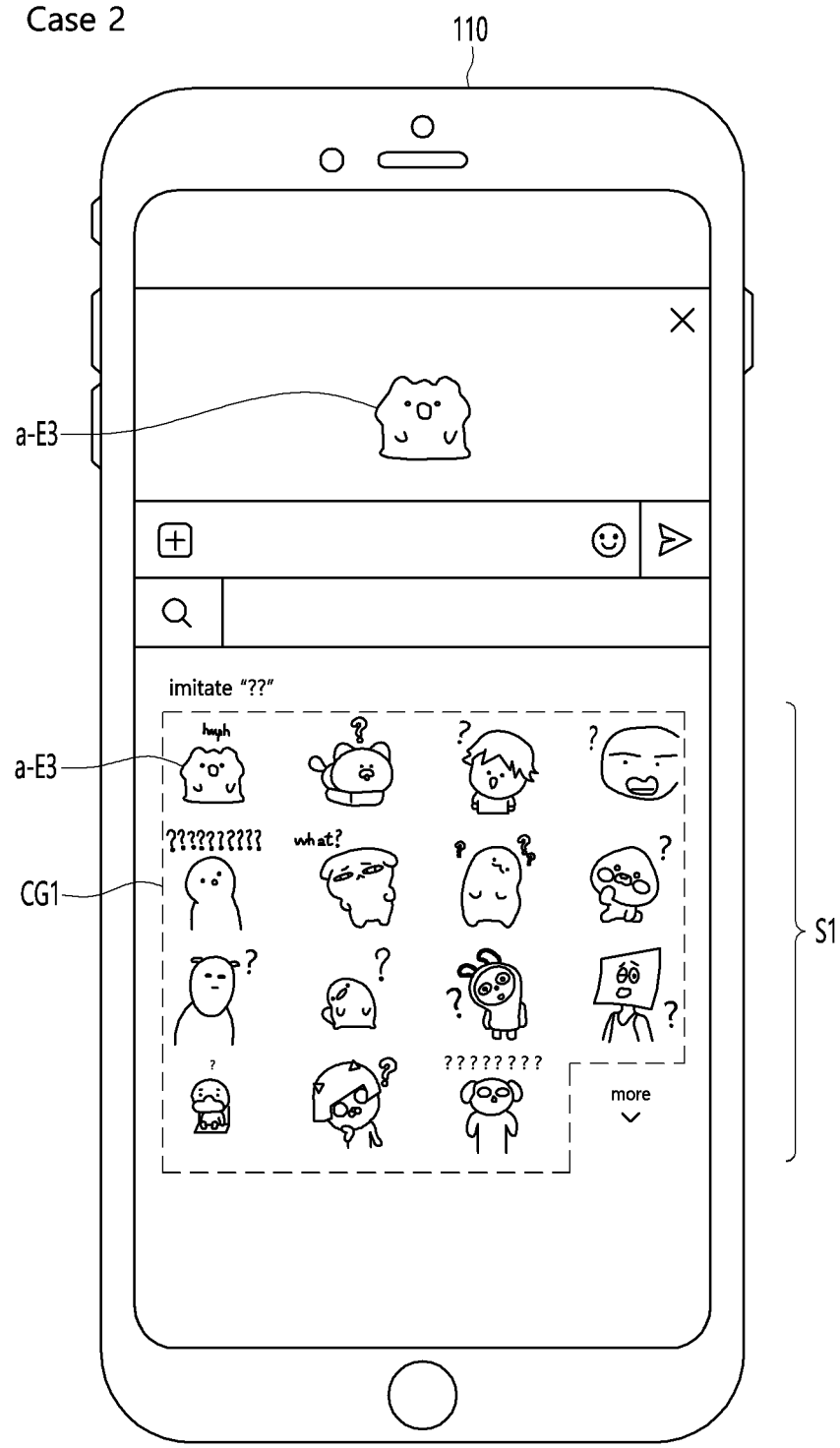

However, even if the first member has the first authority, if the first member does not have the second authority for the second content list CG2 in the second authority determining operation (S730) for the second content list CG2, only the first content CG1 may be selected in the selection operation (S300), and only the first content list CG1 may be provided to the first terminal 110 as shown in Case 2 illustrated in FIGS. 9 and 11 in the content list providing operation (S400).

In addition, in the operation (S710) of determining whether there is an authority the first content list CG1, if the first member is not a regular payment user, it may be determined that the first member does not have the first authority.

Figure 12:
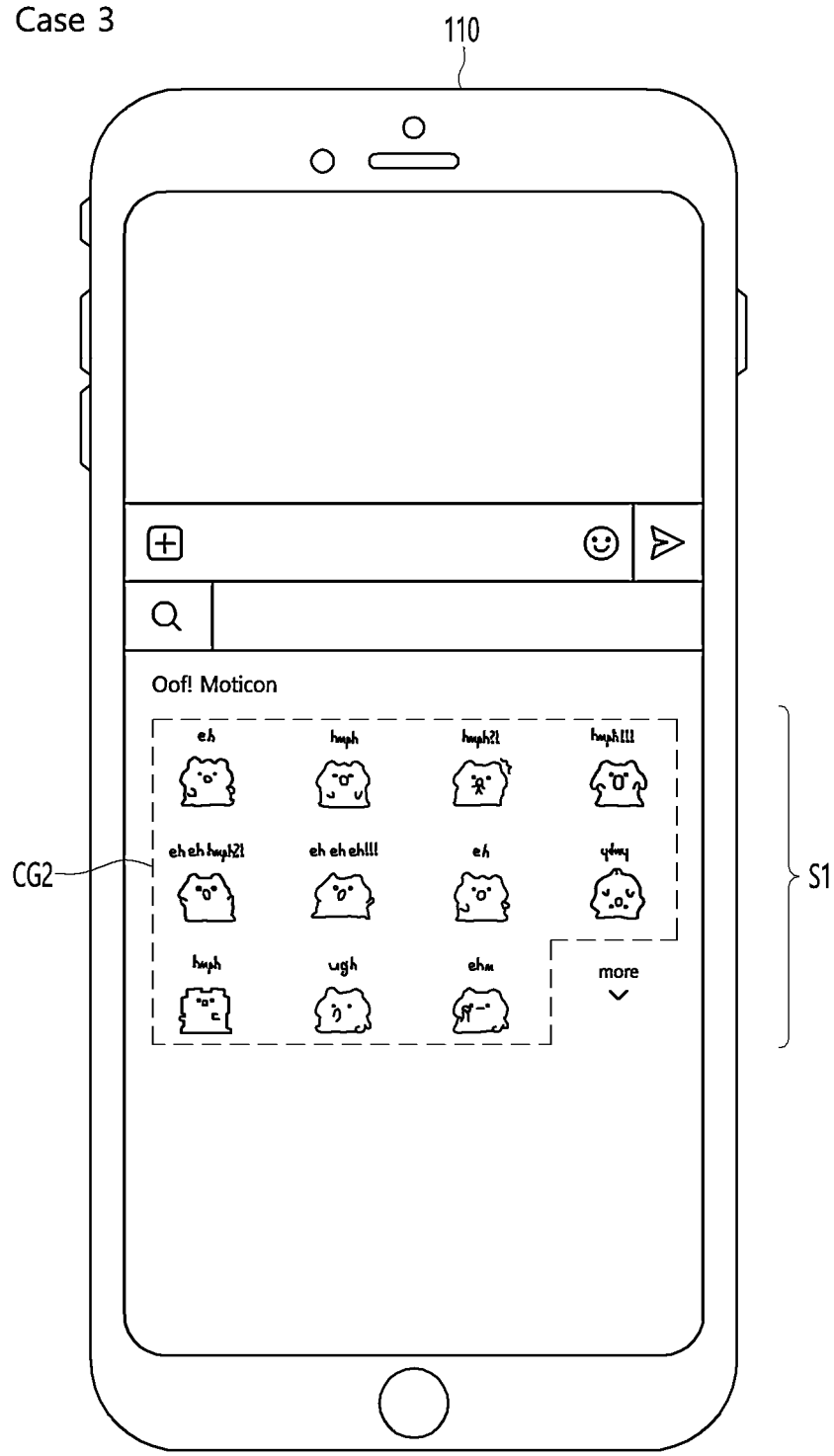

As such, when it is determined that the first member does not have the first authority and the first member already downloads the content list to which the source content a-E1 belongs and has an authority for the group to which the source content a-E1 belongs in operation (S720) of determining whether there is a second authority for the second content list CG2, only the second content list CG2 may be provided to the first terminal 110 as in Case 3 illustrated in FIGS. 9 and 12 in the content list providing operation.

Figure 13:
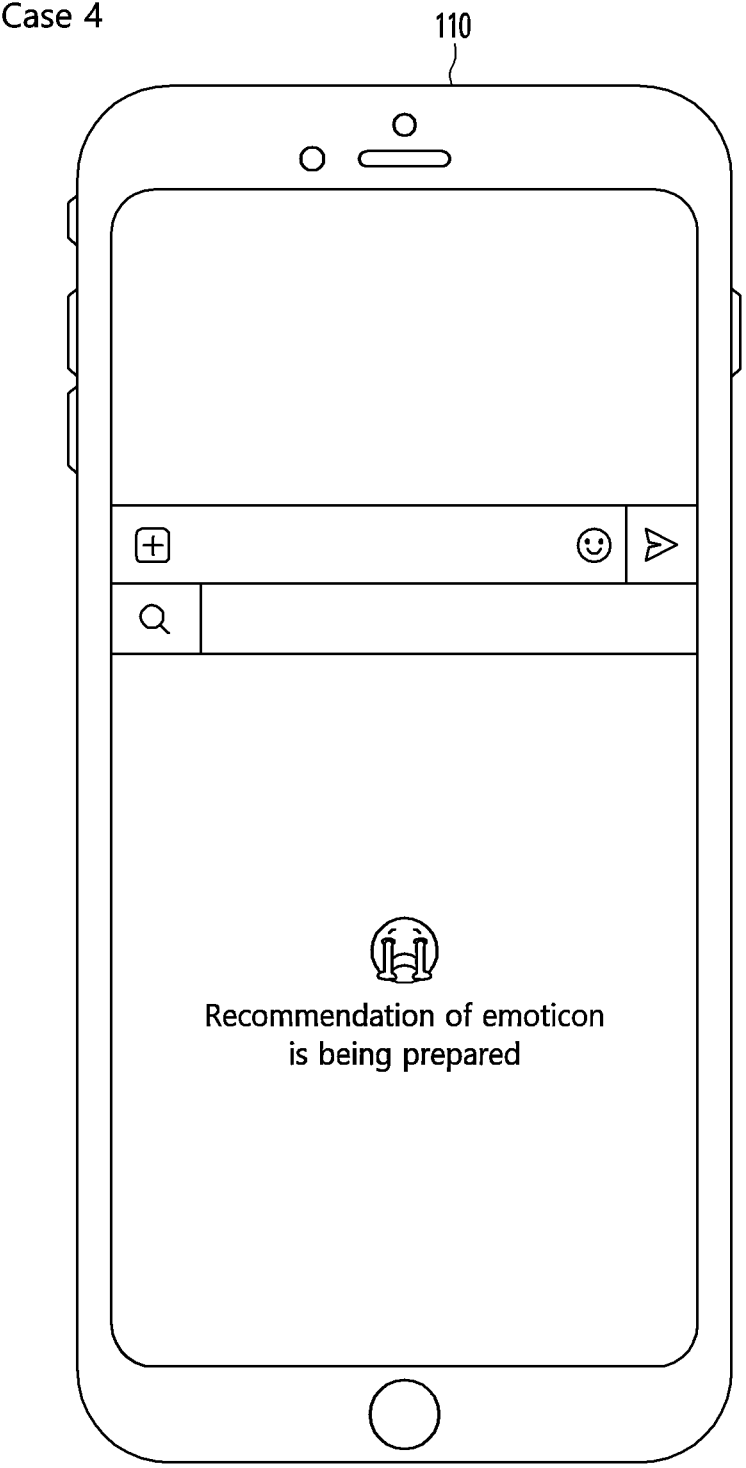

In addition, when it is determined that the first member does not have the first authority or the second authority, the messenger server 200 may display that the first content list CG1 and the second content list CG2 cannot be provided to the first user terminal as shown in Case 4 illustrated in FIGS. 9 and 13 in the content list providing operation (S400).

In the provision availability determining operation (S800), whether the first content list CG1 is available to be provided may be determined according to whether the at least one processor determines whether there is a keyword of the source content a-E1 or whether the number of keyword-related contents is equal to or greater than a predetermined reference, and in the content list providing operation S400, whether to provide the first content list CG1 may be determined according to whether the first content is available to be provided.

For example, even if it is determined that the first member has the first authority in the authority determining operation (S700), if the keyword for the source content a-E1 does not exist in the messenger server 200 or the source content a-E1 does not exist in the messenger server 200, if a keyword-related content matched to the keyword of the source content a-E1 does not exist, or if the number of the keyword-related contents is less than a predetermined reference, the messenger server 200 may control not to provide the first content list CG1 to the first terminal 110 in the provision availability determining operation (S800).

In addition, in the provision availability determining operation S800, the at least one processor may determine whether the second content list CG2 is available to be provided according to whether there is a group to which the source content a-E1 belongs or whether the number of group-related contents is equal to or greater than a predetermined reference, and in the content list providing operation (S400), whether the second content list CG2 is to be provided may be determined according to whether the second content is available to be provided.

As an example, even if it is determined that the first member has the second authority in the authority determining operation (S700), if there is no group to which the source content a-E1 belongs in the messenger server 200, or if the number of group-related contents is less than a predetermined reference, the messenger server 200 may control not to provide the second content list CG2 to the first terminal 110 in the provision availability determining operation S800.

So far, an example of a method for providing a content list according to an embodiment of the present disclosure has been described. Hereinafter, the messenger server 200 performing the method for providing a content list will be described.

Figure 14:
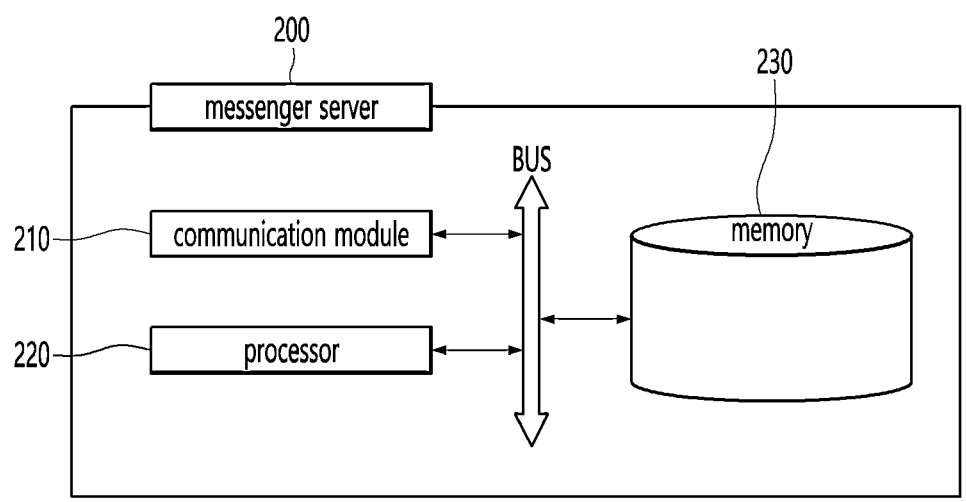
FIG. 14 is a view illustrating an example of a messenger server that provides a content list according to an example of the present disclosure.

FIG. 14 is a view illustrating an example of a messenger server 200 that provides a content list according to an example of the present disclosure.

As shown in FIG. 14, the messenger server 200 may include a communication module 210, at least one processor 220, and a memory 230. The communication module 210, the at least one processor 220, and the memory 230 may transmit or receive information to each other through a bus.

The communication module 210 may communicate with the user terminal 100 through a network.

The memory 230 may have the form of a storage medium such as a hard disk, a Solid State Drive (SSD), a ROM, or a RAM. The memory 230 may store content identification information for each of the entire contents, keyword information for each content identification information, and group information, and regular payment information of the user including the first member may be stored in the instant message service.

The at least one processor 220 may provide an instant message service, and may include a program executing instructions included in a memory in the form of hardware such as a CPU chip.

As described above with reference to FIGS. 2 and 8, the at least one processor 220 may perform a function of providing source content to a chat room in the instant message service in which the first and second members participate.

Thereafter, the at least one processor 220 may receive content list provision request information in relation to the source content from the first terminal 110 of the first member.

Next, the at least one processor 220 may determine whether the first member has the first authority to receive the first content list CG1 and the second authority to receive the second content list CG2.

In addition, the at least one processor 220 may configure the first content list CG1 among the entire contents in order to select the first content list CG1 or may select the second content list CG2.

In addition, the at least one processor 220 may determine whether the first content list CG1 is available to be provided or whether the second content list CG2 is available to be provided.

Next, the at least one processor 220 may provide at least one list of the first content list CG1 and the second content list CG2 to the first terminal 110.

Thereafter, the at least one processor 220 may receive information on selection content selected by the first member from among the contents included in the at least one content list from the first terminal 110.

Finally, the at least one processor 220 may provide the selection content selected by the first member to the chat room.

As described above, the content list providing method and server according to an embodiment of the present disclosure may provide a first content list related to a keyword for a source content used by a second member who is a chatting counterpart in a chat room and a second content list related to a group to which the source content belongs to the first terminal 110 of the first member so that the first member who is a user may easily use the content, thereby further improving user convenience.

The embodiments described above may be implemented by a hardware component, a software component, and/or a combination of a hardware component and a software component. The method according to the embodiment may be implemented in the form of program instructions that may be executed through various computer means and recorded in a computer-readable medium.

The technical features disclosed in each embodiment of the present disclosure are not limited only to the corresponding embodiment and may be combined and applied to different embodiments unless they are mutually incompatible.

Accordingly, in each embodiment, each technical feature is mainly described, but unless the technical features are incompatible with each other, the technical features may be merged and applied.

The present disclosure is not limited to the embodiments and the accompanying drawings described above, and various modifications and variations may be made from the point of view of those skilled in the art to which the present embodiment pertains. Accordingly, the scope of the present embodiment should be defined not only by the claims of the present disclosure, but also by the claims and their equivalents.

What is claimed:

1. A method for providing a content list by a user terminal, the method comprising:
displaying, by the user terminal, a source content provided by a counterpart participant of a chat room on the chat room;
receiving, by the user terminal, selection on the source content from a user; and
displaying, by the user terminal, at least one of a first content list including at least one keyword-related content related to a keyword of the source content and a second content list including at least one group-related content that belongs to the same group as a group of the source content on the user terminal,
wherein the keyword-related content is a keyword identical or similar to the keyword of the source content or a keyword corresponding to a predetermined combination with the keyword of the source content,
wherein the group-related content shares at least one characteristic with the source content's character, the character's family, or the creator,
wherein the first content list includes keyword information that is related to the keyword and displayed together with the keyword-related content, and
wherein the second content list includes group name information that is related to the group and displayed together with the group-related content.

2. The method of claim 1, wherein the source content and the keyword-related content are contents that belong to different groups.

3. The method of claim 1, wherein in the displaying of at least one of the first content list and the second content list, the displaying depends on whether the user terminal's user account has an authority to access at least one of the first content list and the second content list.

4. The method of claim 3, wherein whether the user account has an authority is related to at least one of a payment status and a download status for at least one of the first content list and the second content list.

5. The method of claim 1, wherein in the displaying of at least one of the first content list and the second content list, the user terminal displays both the first content list and the second content list.

6. The method of claim 5, wherein in the displaying of at least one of the first content list and the second content list, the user terminal displays the first content list and the second content list in separately from each other.

7. The method of claim 1, wherein in the displaying at least one of the first content list and the second content list, the user terminal displays at least one of the first content list and the second content list in a partial area of the chat room.

8. A non-transitory computer readable recording medium storing instructions, when executed by one or more processors, configured to perform a method for providing a content list by a user terminal, the method comprising:
displaying, by the user terminal, a source content provided by a counterpart participant of a chat room on the chat room;
receiving, by the user terminal, selection on the source content from a user; and
displaying, by the user terminal, at least one of a first content list including at least one keyword-related content related to a keyword of the source content and a second content list including at least one group-related content that belongs to the same group as a group of the source content on the user terminal,
wherein the keyword-related content is a keyword identical or similar to the keyword of the source content or a keyword corresponding to a predetermined combination with the keyword of the source content, wherein the group-related content shares at least one characteristic with the source content's character, the character's family, or the creator, wherein the first content list includes keyword information that is related to the keyword and displayed together with the keyword-related content, and wherein the second content list includes group name information that is related to the group and displayed together with the group-related content.

9. A user terminal displaying a content list, the user terminal comprising:
- a memory storing instructions; and
- a processor configured to execute the instructions to:
  - display, by the user terminal, a source content provided by a counterpart participant of a chat room on the chat room;
  - receive, by the user terminal, selection on the source content from a user; and
  - display, by the user terminal, at least one of a first content list including at least one keyword-related content related to a keyword of the source content and a second content list including at least one group-related content that belongs to the same group as a group of the source content on the user terminal, wherein the keyword-related content is a keyword identical or similar to the keyword of the source content or a keyword corresponding to a predetermined combination with the keyword of the source content, wherein the group-related content shares at least one characteristic with the source content's character, the character's family, or the creator, wherein the first content list includes keyword information that is related to the keyword and displayed together with the keyword-related content, and wherein the second content list includes group name information that is related to the group and displayed together with the group-related content.

10. The user terminal of claim 9, wherein the source content and the keyword-related content are contents that belong to different groups.

11. The user terminal of claim 9, wherein in the displaying of at least one of the first content list and the second content list, the displaying depends on whether the user terminal's user account has an authority to access at least one of the first content list and the second content list.

12. The user terminal of claim 11, wherein whether the user account has an authority is related to at least one of a payment status and a download status for at least one of the first content list and the second content list.

13. The user terminal of claim 9, wherein in the displaying of at least one of the first content list and the second content list, the user terminal displays both the first content list and the second content list.

14. The user terminal of claim 13, wherein in the displaying of at least one of the first content list and the second content list, the user terminal displays the first content list and the second content list in separately from each other.

15. The user terminal of claim 9, wherein in the displaying at least one of the first content list and the second content list, the user terminal displays at least one of the first content list and the second content list in a partial area of the chat room.

* * * * *